(12) United States Patent
Li et al.

(10) Patent No.: US 9,021,402 B1
(45) Date of Patent: Apr. 28, 2015

(54) OPERATION OF MOBILE DEVICE INTERFACE USING GESTURES

(75) Inventors: Yang Li, Palo Alto, CA (US); Hao Lu, Seattle, WA (US)

(73) Assignee: Google Inc., Mountain View, CA (US)

( * ) Notice: Subject to any disclaimer, the term of this patent is extended or adjusted under 35 U.S.C. 154(b) by 178 days.

(21) Appl. No.: 13/244,105

(22) Filed: Sep. 23, 2011

Related U.S. Application Data

(60) Provisional application No. 61/386,441, filed on Sep. 24, 2010.

(51) Int. Cl.
G06F 3/00 (2006.01)
G06F 3/041 (2006.01)

(52) U.S. Cl.
CPC .................... *G06F 3/0416* (2013.01)

(58) Field of Classification Search
CPC . G06F 3/04883; G06F 3/0482; G06F 3/0484; G06F 3/04842; G06F 3/04845
USPC .......................... 715/234, 243, 254, 255, 863
See application file for complete search history.

(56) References Cited

U.S. PATENT DOCUMENTS

| | | | |
|---|---|---|---|
| 5,726,669 A | 3/1998 | Obata et al. | |
| 5,729,687 A | 3/1998 | Rothrock et al. | |
| 5,748,185 A | 5/1998 | Stephan et al. | |
| 5,781,662 A | 7/1998 | Mori et al. | |
| 5,809,240 A | 9/1998 | Kumagai | |
| 5,867,156 A | 2/1999 | Beard et al. | |
| 5,872,924 A | 2/1999 | Nakayama et al. | |
| 5,880,743 A | 3/1999 | Moran et al. | |
| 5,909,213 A | 6/1999 | Martin | |
| 5,923,307 A | 7/1999 | Hogle, IV | |
| 5,923,323 A | 7/1999 | Chiu et al. | |
| 6,049,329 A | 4/2000 | Zetts et al. | |
| 6,057,845 A | 5/2000 | Dupouy | |
| 6,061,717 A | 5/2000 | Carleton et al. | |
| 6,167,433 A | 12/2000 | Maples et al. | |
| 6,476,834 B1 | 11/2002 | Doval et al. | |
| 6,545,669 B1 | 4/2003 | Kinawi et al. | |
| 6,668,081 B1 | 12/2003 | Llan et al. | |
| 6,842,795 B2 | 1/2005 | Keller | |
| 6,956,562 B1 | 10/2005 | O'Hara et al. | |
| 6,992,702 B1 | 1/2006 | Foote et al. | |
| 7,004,394 B2 | 2/2006 | Kim | |
| 7,202,861 B2 | 4/2007 | Lynggaard | |
| 7,277,726 B2 | 10/2007 | Ahya et al. | |
| 7,289,110 B2 | 10/2007 | Hansson | |

(Continued)

OTHER PUBLICATIONS

Notice of Allowance from U.S. Appl. No. 13/250,055, dated May 15, 2012, 11 pp.

(Continued)

*Primary Examiner* — Kyle Stork
(74) *Attorney, Agent, or Firm* — Shumaker & Sieffert, P.A.

(57) ABSTRACT

In general, this disclosure describes techniques for providing a user of a computing device (e.g., a mobile device) with the ability to utilize drawn gestures to operate objects displayed on a user interface of the computing device. Specifically, the techniques of this disclosure may, in some examples, include receiving user input comprising a gesture that defines an attribute associated with one or more target elements displayed in the user interface and graphically highlighting the one or more target elements in the user interface. The user may then utilize the drawn gesture to operate the highlighted target element by interacting with the defined selection area.

19 Claims, 10 Drawing Sheets

(56) References Cited

U.S. PATENT DOCUMENTS

| | | | |
|---|---|---|---|
| 7,353,453 | B1 | 4/2008 | Simmons |
| 7,532,196 | B2 | 5/2009 | Hinckley |
| 7,533,189 | B2 | 5/2009 | Mahajan et al. |
| 7,536,034 | B2 | 5/2009 | Rhoads et al. |
| 7,536,656 | B2 | 5/2009 | Hullender et al. |
| 7,557,774 | B2 | 7/2009 | Baudisch et al. |
| 7,567,233 | B2 | 7/2009 | Garibaldi et al. |
| 7,614,019 | B2 | 11/2009 | Rimas Ribikauskas et al. |
| 7,636,794 | B2 | 12/2009 | Ramos et al. |
| 7,643,006 | B2 | 1/2010 | Hill et al. |
| 7,698,660 | B2 | 4/2010 | Sanchez et al. |
| 7,702,130 | B2 | 4/2010 | Im et al. |
| 7,724,242 | B2 | 5/2010 | Hillis et al. |
| 7,750,891 | B2 | 7/2010 | Stephanick et al. |
| 7,817,991 | B2 | 10/2010 | Hinckley et al. |
| 7,818,177 | B1 | 10/2010 | Bangalore et al. |
| 7,821,503 | B2 | 10/2010 | Stephanick et al. |
| 7,831,933 | B2 | 11/2010 | Marggraff et al. |
| 7,844,914 | B2 | 11/2010 | Andre et al. |
| 7,854,429 | B2 | 12/2010 | Abe |
| 8,060,841 | B2 | 11/2011 | Boillot et al. |
| 8,131,080 | B2 | 3/2012 | Tonouchi |
| 2002/0116205 | A1 | 8/2002 | Ankireddipally et al. |
| 2003/0014615 | A1 | 1/2003 | Lynggaard |
| 2004/0145574 | A1 | 7/2004 | Xin et al. |
| 2004/0240739 | A1 | 12/2004 | Chang et al. |
| 2004/0259537 | A1 | 12/2004 | Ackley |
| 2005/0022130 | A1 | 1/2005 | Fabritius |
| 2005/0093868 | A1 | 5/2005 | Hinckley |
| 2005/0165795 | A1 | 7/2005 | Myka et al. |
| 2005/0275638 | A1 | 12/2005 | Kolmykov-Zotov et al. |
| 2006/0004834 | A1 | 1/2006 | Pyhalammi et al. |
| 2007/0050054 | A1 | 3/2007 | Sambandam Guruparan et al. |
| 2007/0098263 | A1 | 5/2007 | Furukawa et al. |
| 2008/0065722 | A1 | 3/2008 | Brodersen et al. |
| 2008/0235621 | A1 | 9/2008 | Boillot |
| 2008/0240568 | A1 | 10/2008 | Tonouchi |
| 2008/0250012 | A1 | 10/2008 | Hinckley et al. |
| 2009/0058820 | A1* | 3/2009 | Hinckley ................ 345/173 |
| 2009/0077501 | A1* | 3/2009 | Partridge et al. ........... 715/846 |
| 2009/0286572 | A1 | 11/2009 | Rhoads et al. |
| 2010/0211920 | A1* | 8/2010 | Westerman et al. ......... 715/863 |
| 2010/0261466 | A1 | 10/2010 | Chang et al. |
| 2010/0262905 | A1 | 10/2010 | Li |
| 2010/0293462 | A1 | 11/2010 | Bull et al. |
| 2011/0038552 | A1 | 2/2011 | Lam |
| 2011/0167360 | A1* | 7/2011 | Aitken et al. ............. 715/760 |
| 2011/0239114 | A1 | 9/2011 | Falkenburg et al. |
| 2011/0246891 | A1 | 10/2011 | Schubert et al. |
| 2011/0249024 | A1 | 10/2011 | Arrasvuori et al. |

OTHER PUBLICATIONS

Office Action from U.S. Appl. No. 13/250,055, dated Nov. 28, 2011, 17 pp.

Response to Office Action dated Nov. 28, 2011, from U.S. Appl. No. 13/250,055, filed Feb. 28, 2012, 11 pp.

"CrossY—A crossing-based drawing application" [online]. University of Maryland and Human-Computer Interaction Lab (HCIL). Last updated on May 19, 2006. Retrieved from the Internet: <URL:http://www.cs.umd.edu/hcil/crossy>, 2 pp.

"ShaperWriter" [online]. ShapeWriter, Inc., 2009. Retrieved from the Internet: <URL:http://shapewriter.com/>, 2 pp.

"anyRemote" [online]. sourceforge.net. Maintained by anyRemote. First published on Jun. 20, 2006. Retrieved from the Internet: <http://anyremote.sourceforge.net/>, 2 pp.

U.S. Appl. No. 13/033,295, by Yang Li, filed Feb. 23, 2011, 35 pp.

U.S. Appl. No. 13/250,055, by Yang Li, filed Sep. 30, 2011, 35 pp.

Office Action from U.S. Appl. No. 13/033,295, dated Oct. 5, 2012, 16 pp.

* cited by examiner

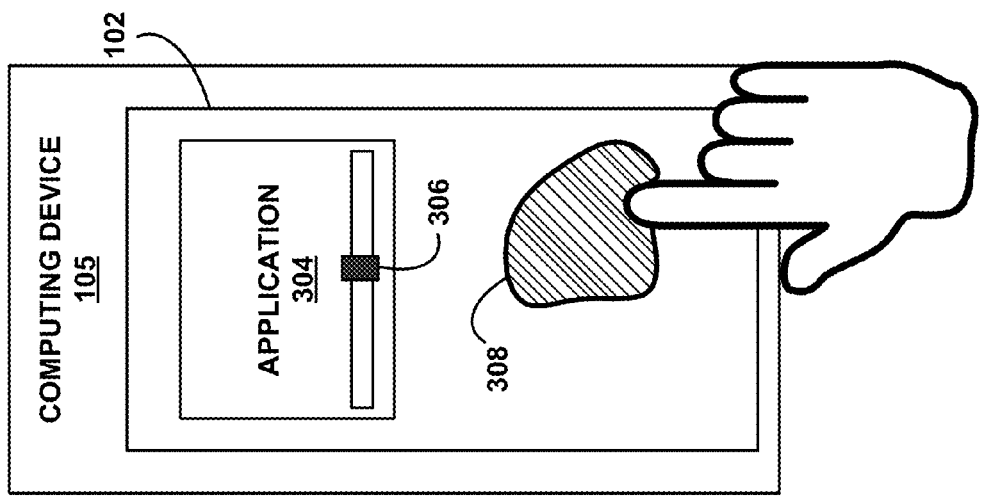
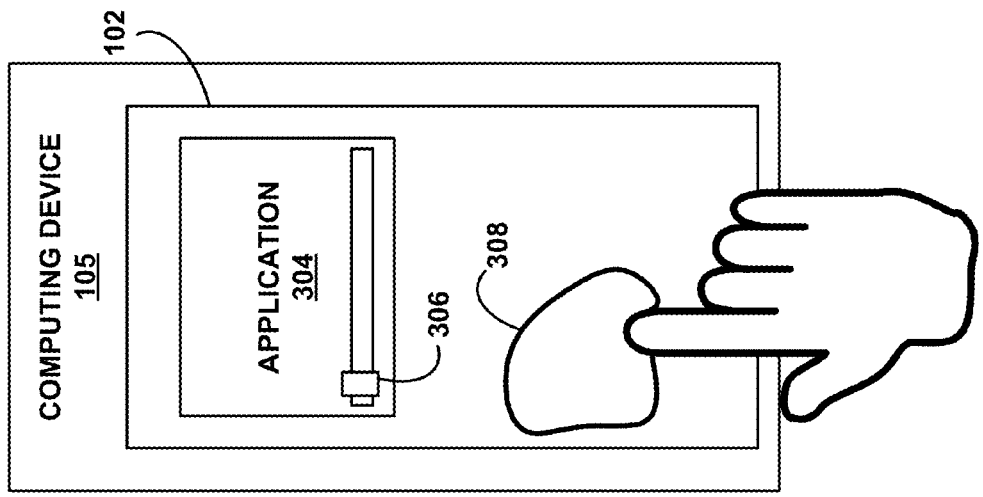
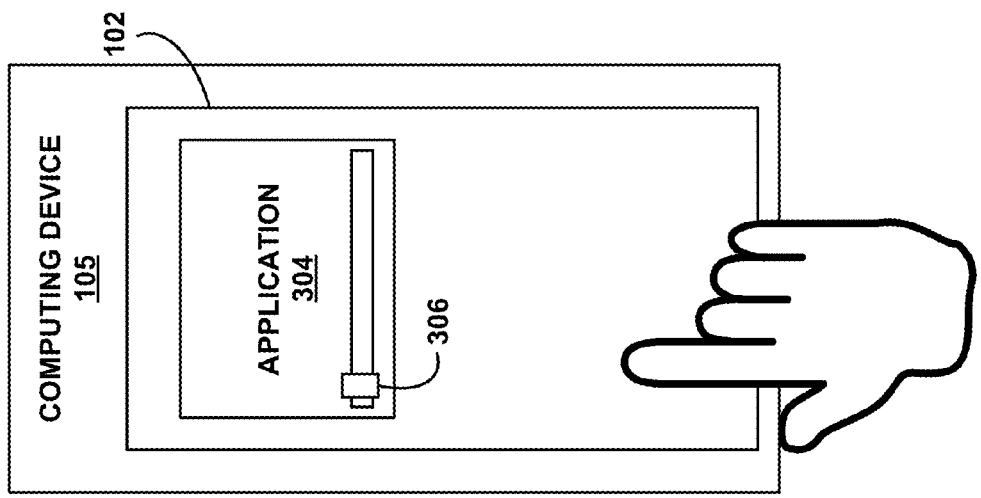

US 9,021,402 B1

OPERATION OF MOBILE DEVICE INTERFACE USING GESTURES

This application claims the benefit of U.S. Provisional Application No. 61/386,441, filed Sep. 24, 2010, which is hereby incorporated by reference in its entirety.

BACKGROUND

Finger-based touch input, though intuitive, suffers from imprecision due to at least two known problems. One problem is that the area touched by a user's finger is, in some situations (e.g., with small mobile devices), much larger than a single pixel. (This is known as the "fat finger" problem.) This results in significant imprecision where the touchscreen device is rather small (e.g., a mobile device, such as a smartphone). This problem may be further amplified when the user is in motion, which further reduces the precision of his or her input movements. Another problem is that, given the small dimensions of many touchscreens, the pointing/input finger often occludes the user interface (UI) target before touching the target on the touchscreen.

SUMMARY

In one example, the disclosure is directed to a method comprising receiving, using a touch-sensitive device coupled to a computing device, user input corresponding to a drawn gesture, the drawn gesture defining an attribute associated with one or more target elements that are displayed in a graphical user interface output at the computing device, defining, in the graphical user interface, a graphical selection area that is associated with the drawn gesture, associating at least a first of the one or more target elements with the drawn gesture based at least in part on the attribute defined by the drawn gesture, and selecting the associated at least first of the one or more target elements in the graphical user interface in response to receiving, using the touch-sensitive device, user input associated with the defined graphical selection area.

In another example, the disclosure is directed to a computer-readable storage medium encoded with instructions that, when executed, cause one or more processors to perform operations comprising providing for display, in a graphical user interface of a computing device, a graphical selection area that is based at least in part on a drawn gesture received by user input using a touch-sensitive device, the drawn gesture defining an attribute associated with at least one target element displayed in the graphical user interface, emphasizing graphically the at least one target element, and selecting, by the computing device, the at least one target element in response to receiving user input associated with the graphical selection area.

In another example, the disclosure is directed to a computing device comprising one or more processors, a touch-sensitive device coupled to the computing device for receiving user input corresponding to a drawn gesture, the drawn gesture defining an attribute associated with one or more target elements that are displayed in a graphical user interface output at the computing device and a module operable by the one or more processors to define, in the graphical user interface, a graphical selection area that is associated with the drawn gesture, to associate at least a first of the one or more target elements with the drawn gesture based at least in part on the attribute defined by the drawn gesture, wherein the graphical selection area is larger in size than the associated at least first of the one or more target elements and is used to select the associated at least first of the one or more target elements in the graphical user interface.

The details of one or more implementations of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 3A-3C illustrate an example interaction with a computing device application using drawn gestures in accordance with techniques of this disclosure.

DETAILED DESCRIPTION

Figure 1:
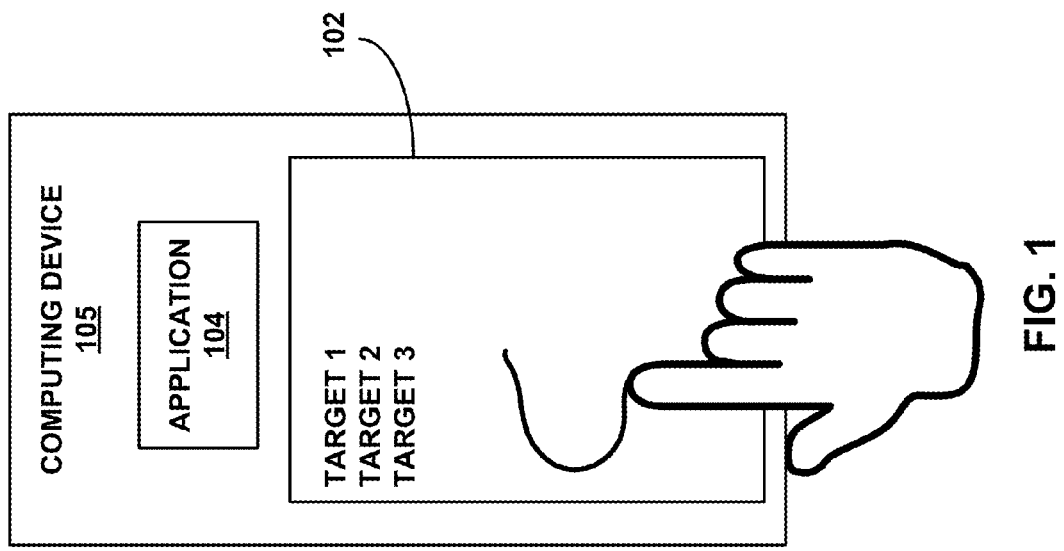
FIG. 1 is a block diagram illustrating an example computing device in accordance with techniques of the present disclosure.

In general, this disclosure describes techniques that facilitate selection of user interface (UI) targets displayed within a touchscreen (UI) of a computing device. The techniques leverage the visibility of graphical user interfaces and the casual interaction of gestures, and can be used to enhance a range of mobile interactions. In some examples, these techniques may be integrated with existing systems, such as mobile web browsers and other mobile applications. In the following discussion, one or more techniques of this disclosure may be implemented in conjunction with an operating mode of a computing device, which may be referred to as "Gesture Avatar mode."

Finger-based touch input, though intuitive, suffers from imprecision due to at least two known problems. One problem is that the area touched by a user's finger is, in some situations (e.g., with small mobile devices), much larger than a single pixel. (This is known as the "fat finger" problem.) This results in significant imprecision where the touchscreen device is rather small (e.g., a mobile device, such as a smartphone). This problem may be further amplified when the user is in motion, which further reduces the precision of his or her input movements. Another problem is that, given the small dimensions of many touchscreens, the pointing/input finger often occludes the UI target before touching it on the touchscreen.

Although existing mobile user interface widgets are often designed to be easily operated by a finger, there may be a conflict between the imprecision associated with finger input and the high precision required for successful use of graphical user interfaces (GUIs). For example, UI widgets can consume precious screen space when designed to be large enough to be finger-operable. This is especially the case as the resolutions of mobile device displays rapidly increase. Further, many UI widgets included in a touchscreen web interface (e.g., hyperlinks or an embedded Flash player included in a mobile web browser) are often relatively small in size on the screen and thus difficult to operate using fingers. Although many solutions have been explored for addressing the above-described "fat finger" and occlusion problems, most require a high degree of precision in both user visual perception and motor control.

In contrast, some gesture-based techniques are better-tailored to allow casual user interaction without undue imprecision. Some examples are panning a map by swiping a finger across the touch screen or zooming in and out with pinching inward and outward motions. However, gesture-based interactions tend to lack the visual feedback provided by graphical user interfaces that include visually perceptible display/interface components. Some existing solutions attempt to combine the advantages of both UI widgets and gesture-based techniques using, for example, rectilinear gestures to select graphical targets. However, some of these solutions can be limited in that they may require the target interface to be designed in a specific way. In addition, some of the existing systems focus mostly on one specific target acquisition step but leave other common interactions unexplored. Therefore, the applicability of many current solutions is often limited to certain functions and/or applications on the device.

The techniques of this disclosure allow a user of a computing device (e.g., a mobile phone) to operate a user interface using gestures. These techniques may leverage the visibility of graphical user interfaces and the casual interaction of gestures. By virtue of the techniques described below, a user can dynamically associate a gesture shape with an arbitrary UI widget and then interact with the widget through the drawn gesture.

Techniques of this disclosure may be used to enhance a range of mobile interactions, resulting in potentially fewer errors during operation of a touchscreen computing device. The techniques of this disclosure may allow the user to operate or select smaller targets without requiring the level of input touch precision usually required for successful selection of such targets. The techniques of this disclosure may be integrated with a variety of functions and applications in existing system (e.g., a mobile web browser or other touchscreen-enabled application).

FIG. 1 is a block diagram illustrating an example computing device 105 in accordance with techniques of the present disclosure. In the example of FIG. 1, computing device 105 may include user interface 102. Computing device 105 may also include functions and applications (such as application 104, which may be running on computing device 105 and have an associated display portion displayed on user interface 102 with which the user may interact). Based on the techniques of this disclosure, a user may utilize gestures indicated on user interface 102 to interact with objects displayed on the same, including elements associated with application 104.

In some examples, computing device 105 may comprise a mobile device. Computing device 105 may comprise or be part of a wireless communication device (e.g., wireless mobile handset or device), a video telephone, a digital multimedia player, a personal digital assistant (PDA), a video game console, a laptop computer, a tablet computer, or other devices. In some examples, computing device 105 may communicate with external, distinct devices via one or more networks (not shown), such as one or more wired or wireless networks, which may, in some cases, provide access to a network (e.g., a local area network, a wide area network, an intranet, or the Internet).

At least a portion of user interface 102 may be a presence-sensitive user interface device. The presence-sensitive user interface device may be, for example, a touch screen of computing device 105, responsive to, for example, tactile input via a user's finger or a stylus pen. Computing device 105 may execute applications such as application 104, with which a user of computing device 105 may interact. During execution, user interaction with user interface 102 may result in controlling operations of functions associated with application 104. The user may utilize tactile input to draw gestures that correspond to objects associated with functions or targets within application 104. The drawn gesture may occupy a large portion of user interface 102 and therefore, may be easily operable by the user. When the user manipulates the drawn gesture, the associated function or target is operated. In this manner, for application functions or targets that may otherwise require great precision and care in the location where the user touches the user interface, a drawn gesture that is more easily manipulated by the user may instead be used to operate the targets without requiring the same amount of precision in interacting with the user interface as that required when directly manipulating the target element itself.

In one example, the techniques of this disclosure may be implemented using an operating application running on computing device 105, where the operating application may utilize one or more modules or algorithms. When the operating application is running on computing device 105, user interface 102 may operate such that tactile input by the user may be interpreted for purposes of gesture drawing and not operating the touchscreen in the usual manner. In one example, the operating application may include a gesture module that acquires the drawn gesture and associates it with a target in an active application. The associated target may be graphically emphasized (e.g., highlighted) to indicate the association, and if it is the desired target, the user may manipulate the drawn gesture to operate the target, as will be described in more detail below.

In one example, the operating application may be operable on computing device 105 to perform, during execution, functions in accordance with the techniques of this disclosure. Computing device 105 may, in various examples, download or otherwise obtain the operating application from an external server via one or more networks (not shown). For example, a web browser hosted by computing device 105 may download one or more applications, such as the operating application, upon access of one or more web sites hosted by such as external server (e.g., web server).

During execution, the operating application may implement, invoke, execute, or otherwise utilize user interface 102 as a mechanism to obtain user input. For example, during execution, the operating application may invoke user interface 102 in gesture-based mode such that a user may provide input to draw gestures in user interface 102 to indicate a target that he/she wishes to select or manipulate using the drawn gesture. The operating application may define a graphical selection area associated with the drawn gesture, which the user may utilize to interact with the drawn gesture. The graphical selection area may be an area defined around the drawn gesture, for example. The operating application may then associate the drawn gesture with a target (e.g., one of target elements 1, 2, or 3) associated with an application executing on computing device 105, e.g., application 104. The user may then manipulate the drawn gesture, to operate the associated function or target.

User interface 102 may, during execution of the operating application, provide the user with at least one portion that is presence-sensitive and with which the user may interact via touch (e.g., by finger or a stylus pen) to draw gestures corresponding objects associated with application 104. A representation of the drawn gestures may be displayed on user interface 102 as the user draws the gestures. The operating application may include gesture-recognition capabilities, which may be capable of recognizing a drawn gesture and translating it into a matching character, e.g., a letter, a shape, or the like. As the user draws gestures on the portion of user interface 102 dedicated for gesture input, the operating application may associate the drawn gesture with a corresponding object in application 104. The association may be based on a first letter of a word, or shape of an operable object, or the like.

The drawn gesture may be associated with an object in application 104, where the target object may be displayed on user interface 102. An indication may be displayed to indicate the associated target object. In one example, the associated object may be emphasized, e.g., highlighted by displaying a box around the item, or displaying the target object in a different color or using a different pattern, or the like. The user may then utilize a gesture (e.g., touching user interface 102) to interact with the drawn gesture to indicate desire to select the highlighted target object or manipulate it to perform a certain operation. In one example, interacting with the drawn gesture may result in executing an action associated with the target object (e.g., advance the playback of a video in a video playback application) or selecting the target object for further action (e.g., selecting a hyperlink in a browser application).

Figure 2:
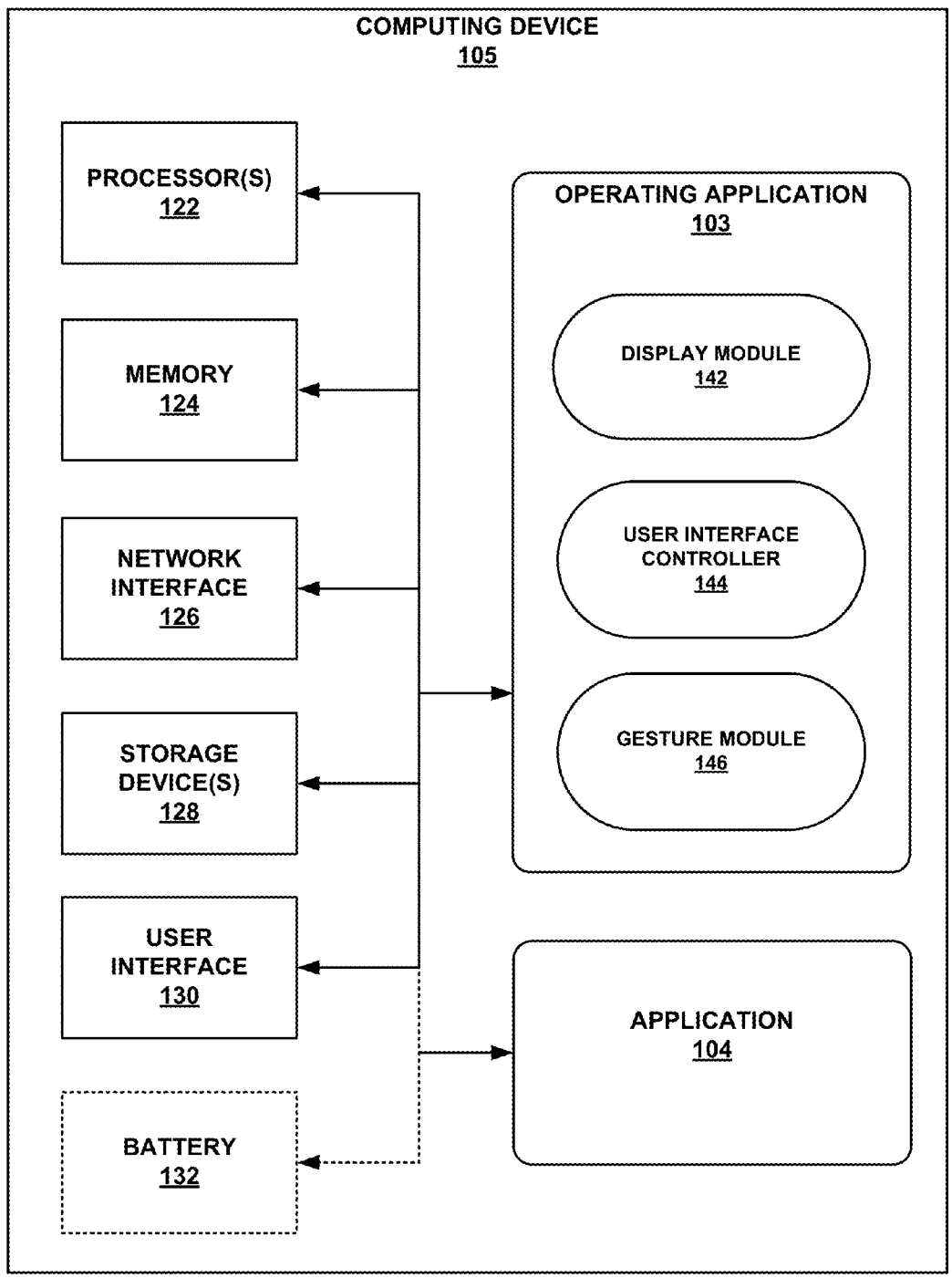
FIG. 2 is a block diagram illustrating further details of one example of the computing device shown in FIG. 1.

FIG. 2 is a block diagram illustrating further details of computing device 105 shown in FIG. 1. FIG. 2 illustrates only one particular example of computing device 105, and many other example embodiments of computing device 105 may be used in other instances. As shown in the example of FIG. 2, computing device 105 includes one or more processors 122, memory 124, a network interface 126, one or more storage devices 128, user interface 130, and an optional battery 132. For example, if computing device 105 comprises a mobile device, computing device 105 may include battery 132. Each of components 122, 124, 126, 128, 130, and 132 may be interconnected via one or more buses for inter-component communications. Processors 122 may be configured to implement functionality and/or process instructions for execution within computing device 105. Processors 122 may be capable of processing instructions stored in memory 124 or instructions stored on storage devices 128.

User interface 130 may include, for example, a monitor or other display device for presentation of visual information to a user of computing device 105. User interface 130 may further include one or more input devices to enable a user to input data, such as a manual keyboard, mouse, touchpad, trackpad, etc. In some examples, user interface 130 may comprise a presence-sensitive user interface device such as, for example, a touch screen, which may be used both to receive and process user input and also to display output information. User interface 130 may further include printers or other devices to output information. In various examples in this disclosure, references made to user interface 130 may refer to portions of user interface 130 (e.g., touch screen) that provide user input functionality. In one example, user interface 130 may be a touch screen that is responsive to tactile input by the user (e.g., by user's finger or stylus pen).

Memory 124 may be configured to store information within computing device 105 during operation. Memory 124 may, in some examples, be described as a computer-readable storage medium. In some examples, memory 124 is a temporary memory, meaning that a primary purpose of memory 124 is not long-term storage. Memory 124 may also be described as a volatile memory, meaning that memory 124 does not maintain stored contents when the computer is turned off. Examples of volatile memories include random access memories (RAM), dynamic random access memories (DRAM), static random access memories (SRAM), and other forms of volatile memories known in the art. In some examples, memory 124 may be used to store program instructions for execution by processors 122. Memory 124 may be used by software or applications running on computing device 105 (e.g., operating application 104 shown in FIG. 1) to temporarily store information during program execution.

Storage devices 128 may also include one or more computer-readable storage media. Storage devices 128 may be configured to store larger amounts of information than memory 124. Storage devices 128 may further be configured for long-term storage of information. In some examples, storage devices 128 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 105 also includes network interface 126. Computing device 105 may utilize network interface 126 to communicate with external devices (e.g., one or more servers, web servers, other computing devices) via one or more networks, such as one or more wireless/wired networks. Computing device 105 may utilize network interface 126 in response to execution of one or more applications that require transferring data to and/or from other devices (e.g., other computing devices, servers, or the like). Computing device 105 may include Wi-Fi or Bluetooth capabilities, for example, which may be configurable to establish communication with other devices through network interface 126.

Any applications implemented within or executed by computing device 105 (e.g., application 104 and/or operating application 103) may be implemented or contained within, operable by, executed by, and/or be operatively coupled to processors 122, memory 124, network interface 126, storage devices 128, and/or user interface 130. Application 104 may be one of many applications running on computing device 105 such as, for example, a multimedia application, a web browser, a word processing application, and so forth.

In one example, computing device 105 may include operating application 103, which allows a user to input gestures on computing device 105 to control operations within application 104 running on computing device 105. Operating application 103 may include a display module 142, a user interface controller 144, and a gesture module 146. Operating application 103 may provide or display user interface 102 on which a user may provide tactile input to draw a gesture that the user may utilize to operate application 104. Operating application 103 may be stored in memory 124 and/or storage devices 130, and may be operable by processors 122 to perform various tasks during execution.

In one example, during implementation or execution of operating application 103, display module 142 may be operable by processors 122 to define at least a portion of user interface 130 to receive gestures via tactile user input. User interface controller 144 may be operable by processors 122 to receive, via user interface 130, user input specifying gestures drawn intended to define a shape or a character associated with an object or target associated with application 104. The user input may comprise contact with user interface 130 (e.g., contact with a touch screen) to draw gestures.

Gesture module 146 may be operable by processor 122 to determine, based on gestures the user draws on user interface 130, the appropriate matching objects or targets within application 104. The drawn gesture may be subsequently associated with the appropriate object or target in application 104. In one example, the object or target may be associated based on a matching shape, letter, or other types of visual characteristics or attributes associated with the object or target. In one example, display module 142 may define at least a portion of user interface 130 for gesture input. In one example, gesture module 146 may display the drawn gestures on user interface 130 and determine and associated the corresponding object in application 104. Subsequently, the associated corresponding object may be highlighted or indicated on the display to alert the user to the association. The user may then interact with the drawn gesture on user interface 130 to manipulate the object, where manipulating the object may result in performing an operation associated with the object, for example. In one example, the user's interaction with the drawn gesture may be in the form of moving the drawn gesture in different directions on user interface 130, which may result in moving the associated target object in application 104 in the same directions (e.g., advancing playback in a multimedia application). In another example, the user's interaction with the drawn gesture may be in the form of tapping the drawn gesture, which may result in activating the associated object in application 104 (e.g., selecting a hyperlink).

Operating application 103 may define at least a portion on user interface 130 where a user may use gestures to draw characters associated with an object or target in application 104 running on computing device 105. The characters may correspond to letters or shapes associated with objects displayed in a window associated with application 104. Furthermore, using additional gestures, the user may be able to apply operations to the associated objects in application 104, e.g., selecting, activating, moving, and the like.

Processor 122 may be operable to execute one or more algorithms including, for example, a gesture-interpretation algorithm. In one example, the gesture-interpretation algorithm may determine a character or shape corresponding to the drawn gestures. In some examples, the algorithm may associate the determined character and shape corresponding to drawn gestures with objects associated with application 104.

FIGS. 3A-3C illustrate an example interaction with a computing device application using drawn gestures in accordance with techniques of this disclosure. As FIG. 3A illustrates, computing device 105 may comprise, among other things, user interface 102, at least part of which may be configured to receive tactile input via a user's finger or stylus, for example. User interface 102 may also display one or more applications or items. In one example, an active application executing on computing device 105 may be displayed on user interface 102.

As FIG. 3A illustrates, active application 304 may be running on computing device 105 and may be displayed in at least one portion of user interface 102. In one example, application 304 may include objects, which may correspond to specific operations or functions, or may be operable with tactile interactions. For example, application 304 may be a multimedia player application with widget 306, which may indicate the progress of playback within a multimedia file being played back in application 304. Widget 306 may be operable by tactile interaction to advance the playback to a desired spot (e.g., fast forwarding or replaying a certain portion). Widget 306 may be, for example, a media player scroll bar, which may be difficult to operate using a finger touch. Using the techniques of this disclosure, a user may activate Gesture Avatar mode, which provides the user with the ability to generate a drawn gesture to more easily operate and manipulate small targets on the user interface, e.g., widget 306. Implementation of Gesture Avatar may use various mode-switching techniques that we will discuss in more detail below.

FIG. 3B illustrates an example technique of this disclosure where a user, while in Gesture Avatar mode, may draw on user interface 102, the shape 308 of the desired target associated with application 104, with which the user would like to interact. In this example, the user may want to interact with the scrolling bar 306 to advance the playback of the video on the screen. In one example, the user may switch to Gesture Avatar mode by selecting a mode from a list of modes on computing device 105, using a dedicated hard key, pressing and holding his/her finger down on the screen, pressing with one finger on user interface 102 while drawing the desired character/shape with another finger, or the like. The user may then draw shape 108 that resembles scroll button or widget 306 on the scroll bar to more easily control playback of the video.

When the user completes drawing the desired gesture, by lifting his finger of user interface 102, for example, drawn gesture 308 may become highlighted, as FIG. 3C shows. Operating application 103 (FIG. 2) may determine based on the shape of drawn gesture 308, the matching object in the active application (e.g., application 304). Operating application 103 may then provide an indication of the best matching object in the active application, in this example widget 306. The indication may be for example, graphically emphasizing the matching object or displaying it differently from normal, for example. Once the corresponding object, e.g., widget 306, is highlighted and the user confirms that it is the object that he/she wanted to control, the user may operate the object (e.g., widget 306) using drawn gesture 308, as FIG. 3C shows. In this example, as the user moves drawn gesture 308, widget 306 moves accordingly. For example, the user may move drawn gesture 308 to the right by holding his finger down and swiping right, and as a result, the matching associated object, i.e., widget 106 moves in the same manner, therefore, advancing the playback of the multimedia, for example.

FIGS. 3A-3C illustrate one example of using the Gesture Avatar to allow a user to interact with user interface using gestures. In the above example, an application (e.g., application 304) may include an object (e.g., widget 306), which may be difficult to manipulate using tactile interaction, because of size issues. Using the techniques of this disclosure, a user may produce a drawn gesture 308 using Gesture Avatar mode, where drawn gesture 308 may match a characteristic or attribute (e.g., shape, first letter, or the like) of the desired object and be as a result associated with the desired object. Manipulating the larger sized drawn gesture 308 may allow operation of the smaller sized widget 306 without requiring precision usually required of interaction with small objects on small touchscreens. Other examples, of applying the techniques of this disclosure may include the example of activating a link in a web browser on computing device 105. The website may include targets, such as hyperlinks, which may be viewable but too small to be easily tapped on by a finger touch on the touchscreen. Techniques of this disclosure may allow a user to interact with the hyperlinks more easily.

Figure 4B:
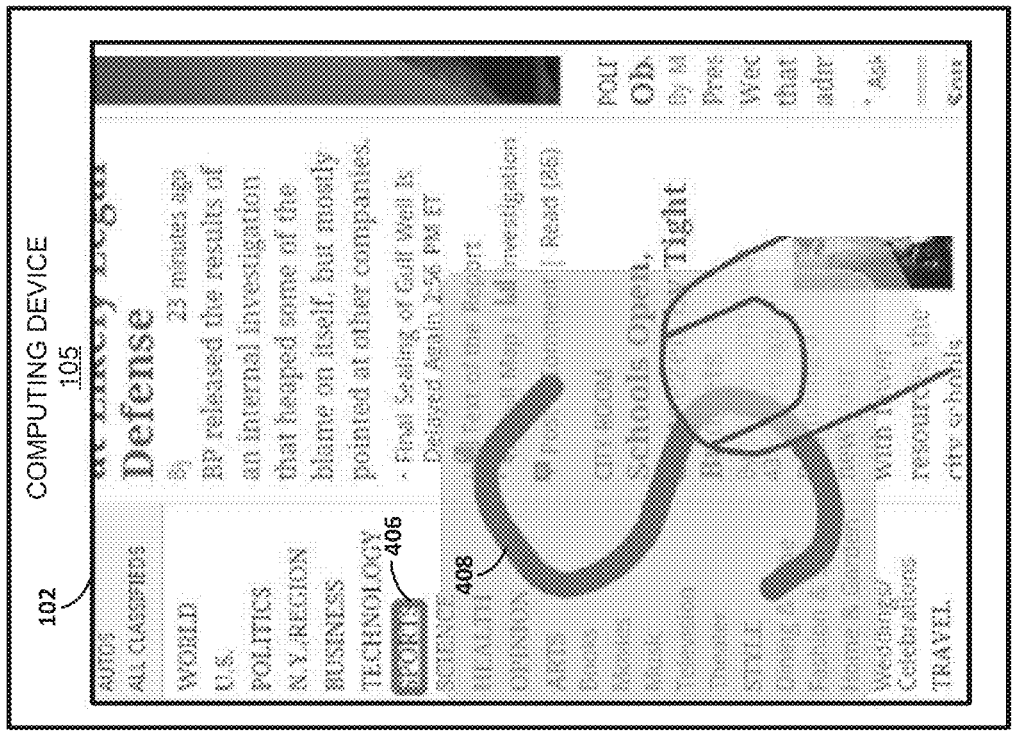
FIGS. 4A-4B illustrate another example interaction with a computing device application using drawn gestures in accordance with techniques of this disclosure.
Figure 4A:
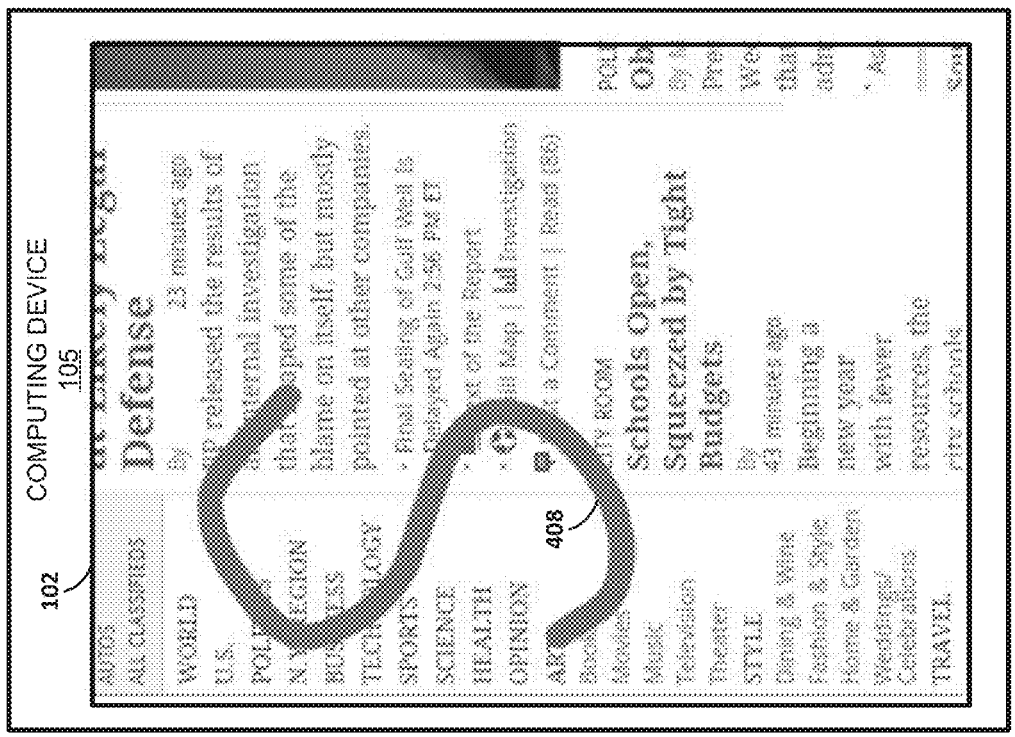

FIGS. 4A-4B illustrate another example interaction with a computing device application using drawn gestures in accordance with techniques of this disclosure. In this example, the user may tap and activate a small target using a drawn gesture. As FIG. 4A illustrates, computing device 105 may comprise, among other things, user interface 102, at least part of which may be configured to receive tactile input via a user's finger or stylus, for example. User interface 102 may also display one or more applications or items. In one example, an active application executing on computing device 105 may be displayed on user interface 102.

As FIG. 4A illustrates, an active application (e.g., application 104 of FIG. 1) may be running on computing device 105 and may be displayed in at least one portion of user interface 102. In one example, the active application may include objects, which may correspond to specific operations or functions, or may be operable with tactile interactions. For example, the active application may be a news website, which may include links to different sections and articles. The user may wish to navigate the to the "Sports" section of the website. Using the techniques of this disclosure, the user may select the Gesture Avatar more, as discussed above, to be able to produce a drawn gesture using tactile input on user interface 102.

While in Gesture Avatar mode, the user may draw on user interface 102, a shape that looks like the letter "S". In one example, the user may enter drawn gesture 408 anywhere on the screen or near the desired object, e.g., the "Sports" link, as FIG. 4A shows. When the user completes drawing the gesture, the operating application (e.g., operating application 103 of FIG. 2) may recognize drawn gesture 408. Additionally, the operating application may match drawn gesture 408 to an object in the active application (e.g., the active web browser window). As FIG. 4B shows, object 406 may match drawn gesture 408 and may be the nearest link to drawn gesture 408.

The operating application may indicate the association between object 406 and drawn gesture 408 by highlighting the associated object, as FIG. 4B illustrates. In this example, the bounding box around object 406 may indicate its association with drawn gesture 408. The user may then trigger the "Sports" hyperlink or object 406, by tapping on drawn gesture 408, which is a larger target than the original target, e.g., the "Sports" link on the screen. As we will be discussed below, to form the association between a drawn gesture and a target object, both the shape of the drawn gesture and its distance to potential targets on the screen may be leveraged.

As the example of FIGS. 4A-4B illustrates, a drawn gesture may provide a larger effective area for a user to comfortably interact with or operate a small target. The type of interaction that Gesture Avatar mode may provide is not limited to tapping-orientated interaction. A drawn gesture may provide the ability to translate most touch interactions with the touchscreen to the action corresponding to the target with which it is associated. For example, a user can long press a drawn gesture for long pressing the original target, e.g., to bring up a context menu.

In one example, a drawn gesture may be initially associated with an incorrect target due to the inaccuracy of gesture recognition or ambiguity of the targets on the screen. In one example, using the example of a web browser page, several targets may match the drawn gesture. For example, as FIG. 5A illustrates, when a user draws an "S" on a website containing several targets that match the drawn gesture (e.g., the letter "S"), the user may be able to interact further using the drawn gesture to select the desired target object.

Figure 5B:
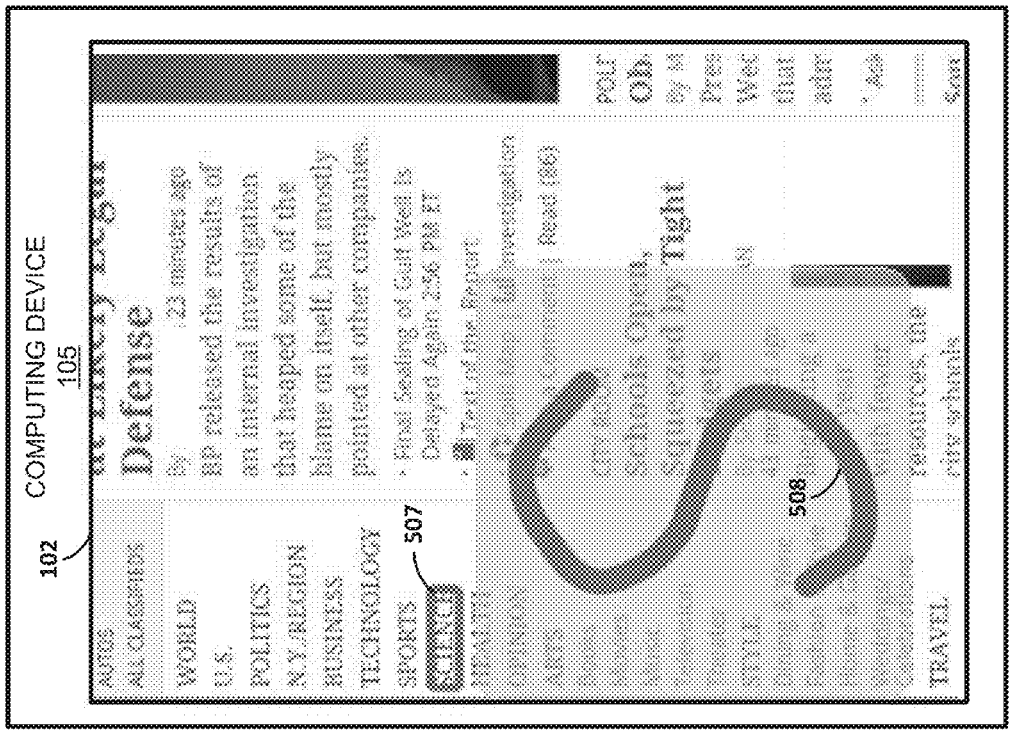
FIGS. 5A-5B illustrate an example where multiple target objects correspond to a drawn gesture, in accordance with techniques of this disclosure.
Figure 5A:
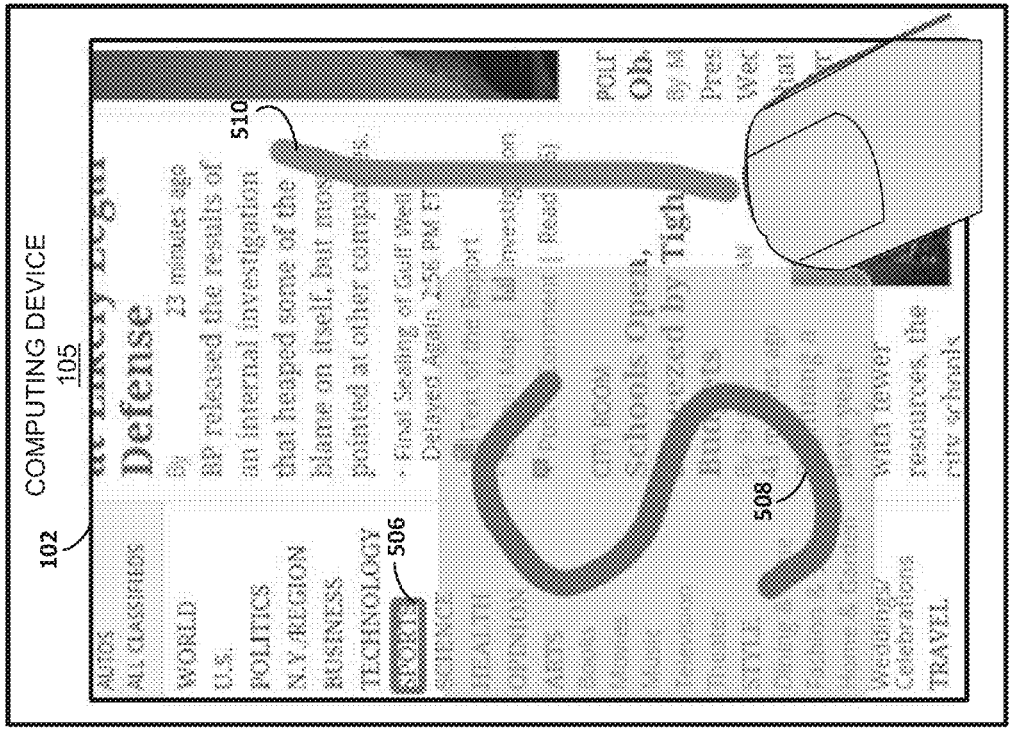

FIGS. 5A-5B illustrate an example where multiple target objects correspond to a drawn gesture, in accordance with techniques of this disclosure. In this example, while in Gesture Avatar mode, the user may draw on user interface 102 a shape that looks like the letter "S." In one example, the user may enter drawn gesture 508 anywhere on the screen or near the desired object, as FIG. 5A shows. When the user completes drawing the gesture, operating application 103 may recognize drawn gesture 508. Additionally, operating application 103 may match drawn gesture 508 to an object in application 104 (e.g., the active web browser window). As FIG. 5A shows, object 506 may match drawn gesture 508 and may be the nearest link to drawn gesture 508. In this example, the nearest link may be the "Sports" link, or object 506, as FIG. 5A shows.

However, the nearest link may be the incorrect link in that the user may have meant to select a different target object. In one example, the user may dismiss the avatar by tapping outside of the avatar and redrawing the avatar. In another example, the user may re-assign a target to the avatar using directional (collinear) gestures, e.g., directional gesture 510. In this example, the user may want to select the link "Science" instead of the link "Sports," which is initially matched to drawn gesture 508. As FIG. 5A illustrates, the user may draw directional gesture 510 outside the region defined by drawing gesture 508, by swiping his/her finger in the desired direction (e.g., up, down). As the user interacts using directional gesture 510, operating application 103 may determine the next best match in the direction defined by direction gesture 510. As FIG. 5B illustrates, using directional gesture 510 allows the user to change the matched object from "Sports" to "Science," for example. Operating application 103 may indicate the changed matching object by highlighting new target object 507, or in this example, the "Science" link. The user may repeat this process of using directional gesture 510, until drawn gesture 508 is associated with the desired target. In one example, the directional gestures used during Gesture Avatar mode may enable a user to easily navigate in the possible matches presented on the screen.

The examples of FIGS. 3A-3C, 4A-4B, and 5A-5B illustrate using the Gesture Avatar mode in a computing device to generate a drawn gesture and utilizing the drawn gesture to operate or activate a target object in an application running on the computing device. The above examples are merely illustrative, and it should be understood that the Gesture Avatar mode in a computing device is not limited to widgets in multimedia applications and/or hyperlinks in web browser applications. The techniques of this disclosure may include other characters and shapes, which may be associated with other types of target objects within applications. Other illustrative examples are shown in FIGS. 6A-6B, which show other examples of interaction with a computing device application using drawn gestures in accordance with techniques of this disclosure.

Figure 6B:
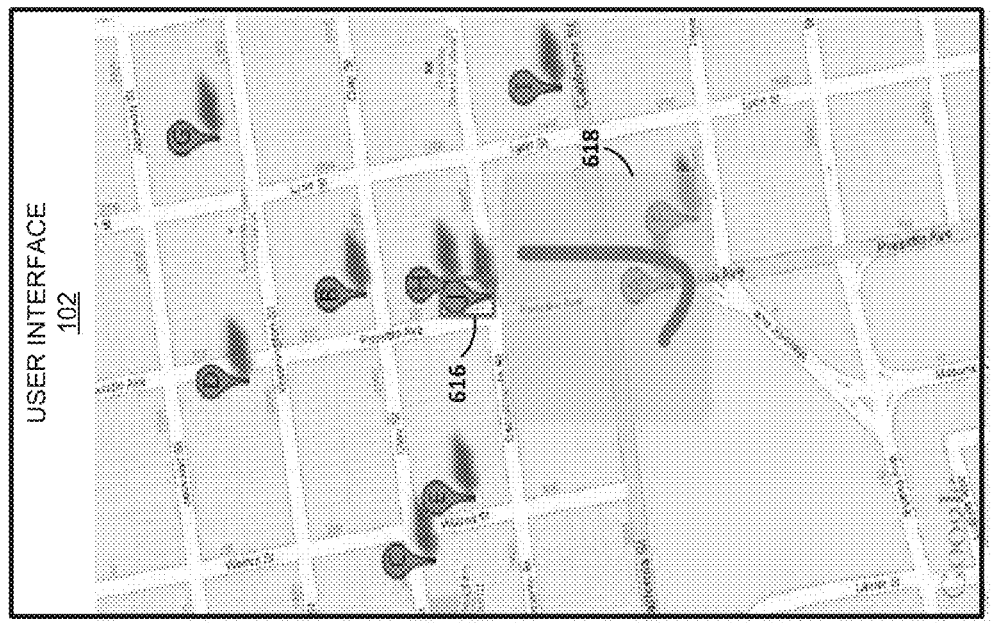
FIGS. 6A-6B illustrate other examples of interaction with a computing device application using drawn gestures in accordance with techniques of this disclosure.
Figure 6A:
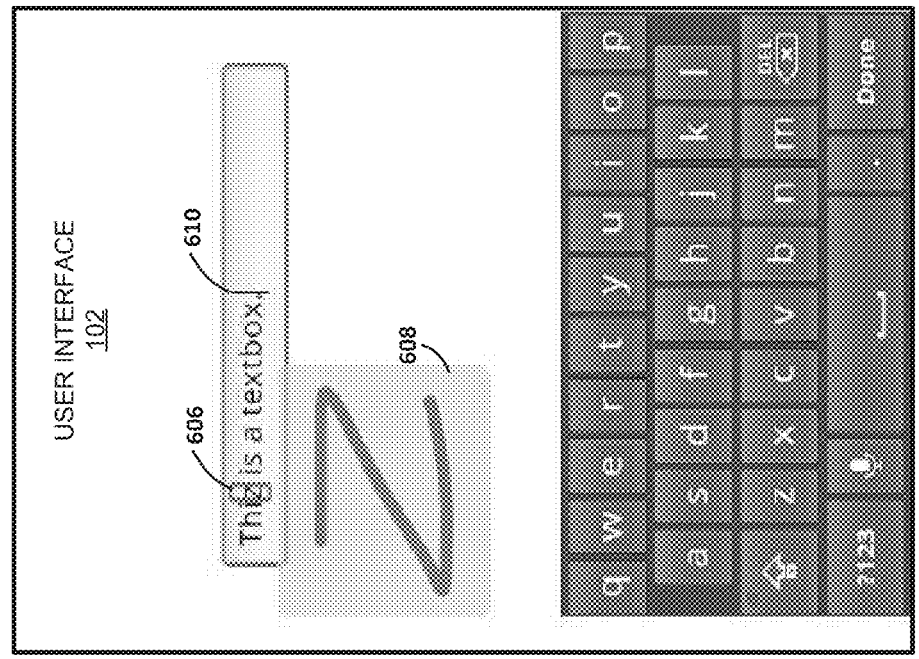

FIG. 6A illustrates an example where techniques of this disclosure may be utilized in a text-based application. A text-based application may be an application in which the user may type text directly within the application or in a text box (e.g., word processing application, text/email message, URL in a browser, and the like). Using the techniques of this disclosure, the user may generate drawn gesture 608 to move a cursor in a text box to a desired location. Touchscreen keyboards on most existing touchscreen devices do not have dedicated keys for moving the cursor. To move the cursor, a user generally needs to directly touch the screen between the two characters at the desired location. However, since text is usually displayed in a small size, moving the cursor may not be easily done by directly touching the screen and may require a high level of precision, which may be difficult to achieve in some situations.

Using the techniques of this disclosure, a user may be able to draw the character before (or after) the desired position of the cursor, and then tap on the right (or left) half of drawn gesture 608 to move the cursor. In this example, the user may wish to move cursor 610 in front of the letter "Z" in the already-entered text. The user may enter Gesture Avatar mode on the computing device and draw a gesture of the letter "Z" on user interface 102. Operating application 103 may then match drawn gesture 608 with a target object in the active application and associate drawn gesture 608 with the target object, as indicated by highlighting associated target object 606. The user may then tap on the right side or the left side of drawn gesture 608 to move cursor 610 either after or before associated target object 606.

FIG. 6B illustrates an example where techniques of this disclosure may be utilized in a map application, e.g., Google maps. Typically, when a list of locations is presented on a map, the locations may be indicated on the map using letters as FIG. 6B shows. However, on a small screen of user interface 102 of a computing device, the locations may be difficult to select because of the small size of the screen and/or in instances where too many locations are close to one another. Using the techniques of this disclosure, a user may generate drawn gesture 618 indicating a character matching a desired target object, e.g., location on the map. In this example, since each location is given a character unique from the remaining locations, the user may not be required to draw the gesture near the desired location. The user may then interact with drawn gesture 618 to manipulate associated target object 616. For example, tapping on drawn gesture 618 may provide information associated with target object 616, e.g., address, phone number, and other information related to the location.

Figure 7:
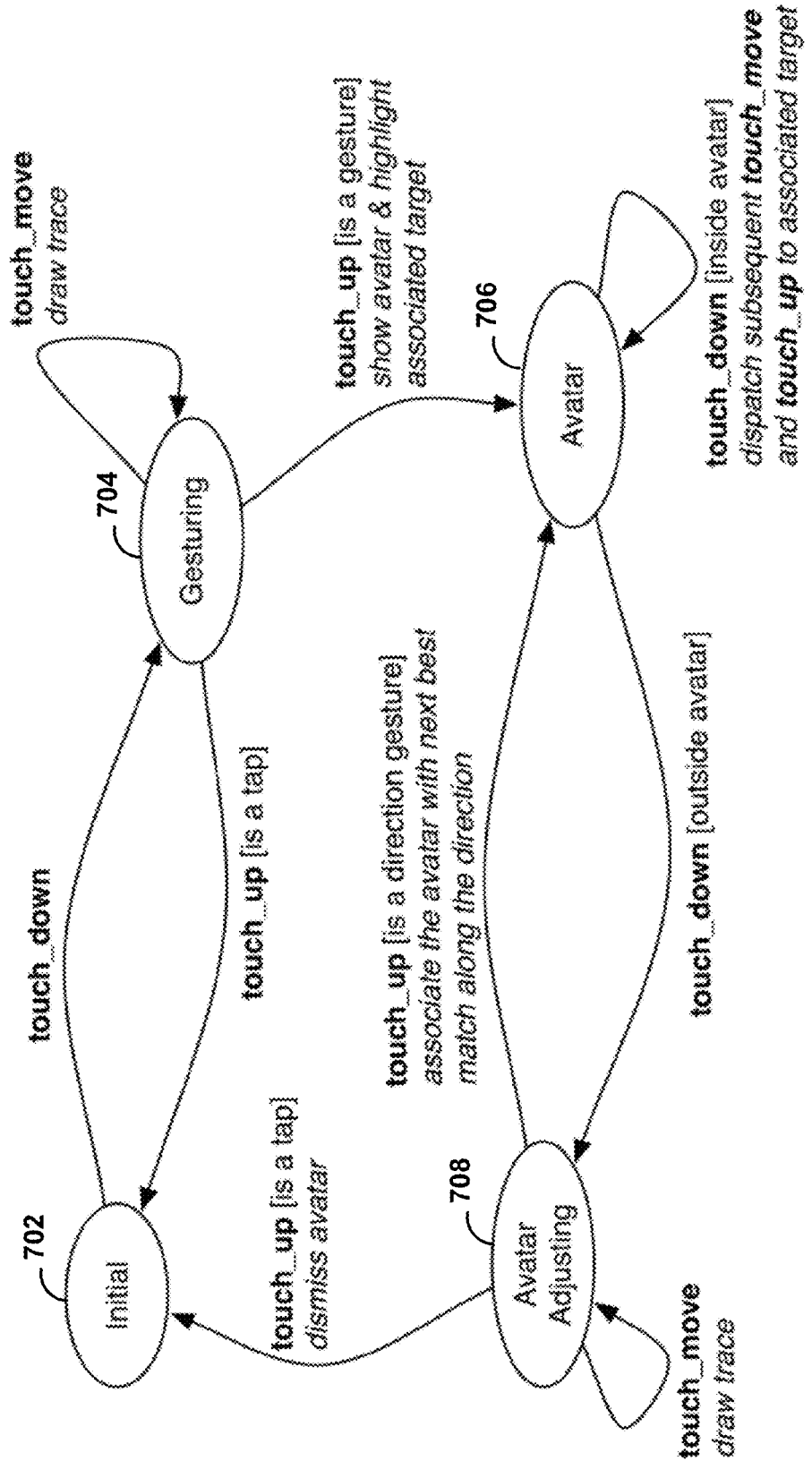
FIG. 7 illustrates an example flow diagram of the interaction of "Gesture Avatar," in accordance with techniques of this disclosure.

FIG. 7 illustrates an example flow diagram of the interaction of Gesture Avatar, in accordance with techniques of this disclosure. The interaction between a user and an application using Gesture Avatar mode may start from initial state 702. Once in Gesture Avatar mode, touch events, such as, touch_down, touch_move, and touch_up may be used to determine the type of action the user desires to induce. Some of the states associated with Gesture Avatar mode may also be Gesturing 704, Avatar 706, and Avatar Adjusting 708.

The interaction with Gesture Avatar may involve four states, as illustrated in FIG. 7. The interaction process starts from the Initial state 702. Once the finger touches the screen, it enters Gesturing state 704. In Gesturing state 704, the touch trace is rendered on top of the graphical user interface that is being operated. When the user lifts his/her finger and the trace is a valid gesture (e.g., the bounding box of the trace is large enough to be considered as a gesture instead of a tap), the process enters Avatar stage 706, in which the drawn gesture stroke forms the drawn gesture with an indication, e.g., a translucent background. The target object that is associated with the avatar may be also indicated, e.g., highlighted.

In Avatar stage 706, the user may choose to operate the associated target through the drawn gesture, or adjust the association if the drawn gesture is associated with an incorrect target object. At this stage, if the user touches down in the drawn gesture, the touch_down as well as the subsequent touch_move and touch_up events may be re-dispatched to the associated target in the user interface. If the user touches outside the drawn gesture, the user can either dismiss the drawn gesture by a tap or adjust the associated target using directional gestures.

Operating application 103 may determine the target object in an active application based on the drawn gesture. In determining the target object, the drawn gesture, g, is matched against a set of targets, T, available on the screen, so that the drawn gesture can be associated with the desired target, $t_{match}$, according to the following equation—Equation 1:

$$t_{match} = \underset{t_i \in T}{\operatorname{argmax}} P(t_i \mid g)$$

Both the semantics of the drawn gesture and its spatial relationship with the target objects on the screen may be leveraged. The combination of these two factors may effectively triangulate a desired target object on the screen. As a result, Equation 1 may be expanded as follows—Equation 2:

$$P(t_i|g) = \alpha P(c_i|s_g) P(p_i|b_g)$$

where $P(c_i|s_g)$ encodes how much the content of the target, $c_i$, matches the semantics of the drawn gesture, $s_g$, and $P(p_i|b_g)$ captures the spatial relationship between a target and the drawn gesture, in particular, the distance between the gesture's bounding box, $b_g$, and the center of the target, $p_i$. The calculation of there two quantities is discussed below.

A drawn gesture may be a character or an arbitrary symbol or shape, and the content of a target may be a set of characters for a textual target (e.g., the initial letter of each word in a hyperlink, e.g., WN for "World News") or the contour or shape of a graphical target (e.g., the triangular boundary of the play button of a media player). Character and shape recognition have several fundamental differences and distinct approaches have been developed in the field for handling each of these cases. Operating application 103 may initially determine a classification as to whether a gesture is a character or a shape, and then different recognizers are employed for each case. For character matching, operating application may employ, for example, a neural network handwriting recognizer that recognizes letters and numbers. The recognized character may then be used to search against the content of each target on the screen.

For shape matching, operating application 103 may use a template-based shape recognizer to which templates, e.g., the contour of each target on the screen, are added dynamically. The shape recognizer then finds the target that has the most similar contour to the drawn gesture. Therefore, rather than only keeping the best guess, this calculation gives a distribution of all possible characters and shapes fed into $P(c_i|s_g)$ of Equation 2 above.

In addition to the above matching based on shape, operating application 103 may also perform matching based on spatial relationship. Since users tend to aim for the desired target, the position of the drawn gesture for interacting with the target may be a strong indicator of where the target is on the user interface. As a result, operating application 103 may also assume, at least initially, that the target is near the drawn gesture, and the farther an object is from the drawn gesture, the less likely that it is the desired target.

Figure 8A:
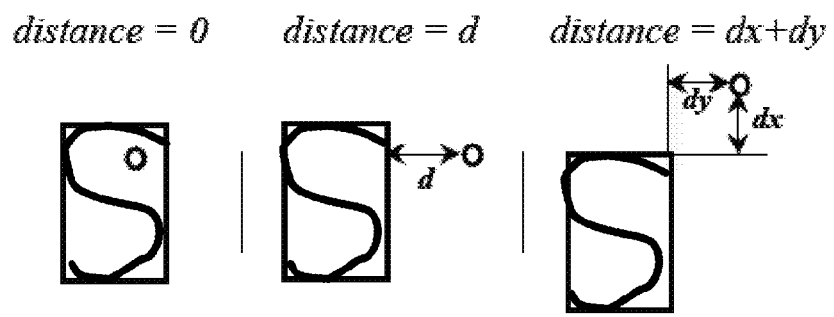
FIG. 8A illustrates an example of calculating the distance between a target and a drawn gesture in accordance with techniques of this disclosure.

To capture this intuition, operating application 103 may utilize a 2D Gaussian distribution over the distance between the center of an object and the boundaries of the drawn gesture. In one example, operating application 103 may utilize the Manhattan distance of an object to the drawn gesture, to save computation when there are numerous objects on the screen, as illustrated in FIG. 8A. In FIG. 8A, the target is denoted as a circle, and the distance to the target is calculated based on the bounding box of the drawn gesture, which in this example is a rectangle, but may be any shape. The output of the Gaussian indicates how likely the object is the target, i.e., $P(p_i|b_g)$.

Figure 8B:
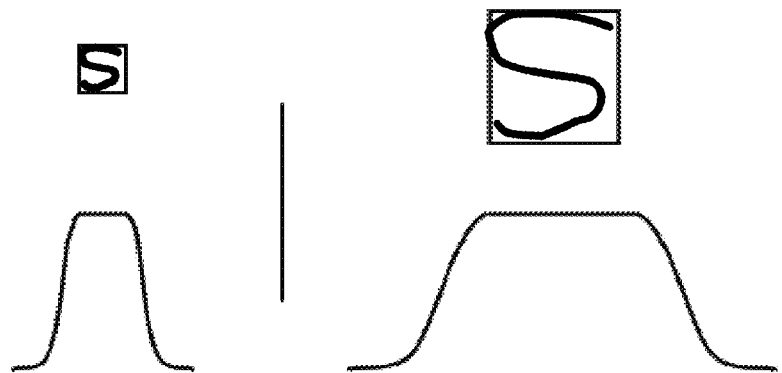
FIG. 8B illustrates an example of the impact of the size of a drawn gesture, in accordance with techniques of this disclosure.

The 2D Gaussian distribution may employ a changing variance that is dynamically adjusted based on the length of the longer edge of the gesture's bounding box, as FIG. 8B illustrates. This design of the algorithm implemented by operating application 103 may be based on the observation that users draw gestures in different sizes, and the smaller the drawn gesture is, the more specific area the user is targeting, or alternatively, the larger the bounding box, the less impact the distance has on the scoring.

Due to the possible inaccuracy of gesture recognition and the inherent ambiguity of objects available on the screen, operating application 103 may associate a drawn gesture with an incorrect object. For example, multiple objects that have similar content may be close to one another and to the drawn gesture. Furthermore, objects on screen edges may also be prone to incorrect matching, since it may be difficult for a user to draw gestures over these objects and the Gaussian distribution cannot efficiently capture this situation.

In one example, operating application 103 may correct a possible mismatch by asking the user to dismiss the drawn gesture and recreate it anew. However, in some situations, this approach may not be guaranteed successful and may be a nuisance if it is only a near miss, e.g., the drawn target is just next to the incorrectly-associated object. In one example of this disclosure, the user may be able to move to the next best match in a given direction according to a directional gesture that the user may indicate, as discussed above in the context of FIG. 5A-5B.

Figure 9:
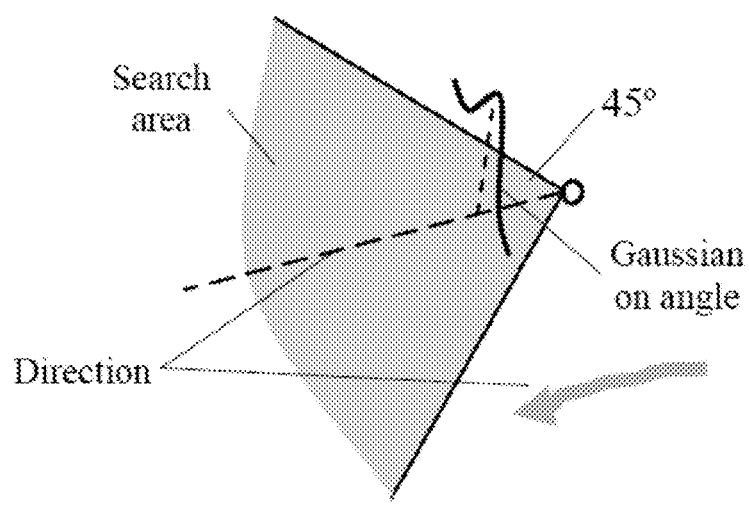
FIG. 9 illustrates an example of a Gaussian function used in searching an area near a drawn gesture for matching target objects, in accordance with techniques of this disclosure.

Based on the directional gesture that a user draws, operating application 103 may determine the next best match based on how well an object matches the drawn gesture semantically, and also based on the angular distance between the directional gesture and the direction from the currently matched object to the object being evaluated. A Gaussian function may be used to give each object a score based on it angular distance. FIG. 9 illustrates an example of a Gaussian function used in searching an area near the drawn gesture for matching objects, while restricting the search area to a certain angle, in accordance with techniques of this disclosure. To reduce computational cost, the search may be restricted to objects within the ±45-degree range of the direction.

Figure 10:
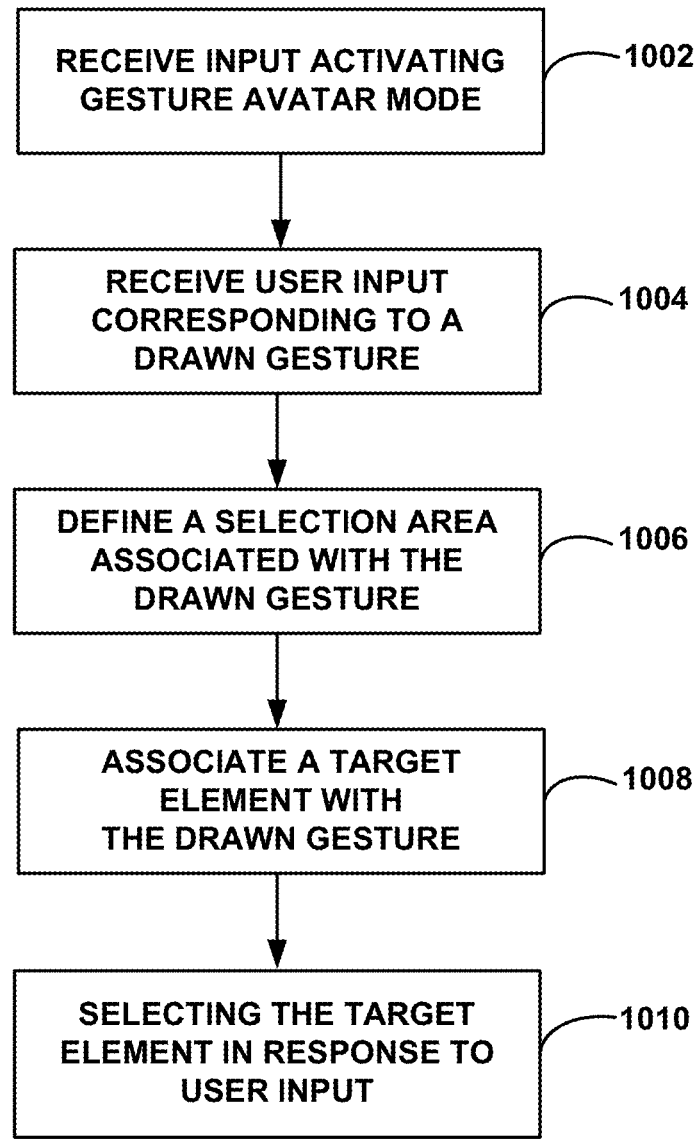
FIG. 10 is a flow diagram illustrating a method that may be performed by a computing device in accordance with one or more aspects of the present disclosure.

FIG. 10 is a flow diagram illustrating a method that may be performed by a computing device in accordance with one or more aspects of the present disclosure. For example, the illustrated example method may be performed, at least in part, by computing device 105 (FIGS. 1 and 2). In some examples, a computer-readable storage medium (e.g., a medium included in storage device 128 of FIG. 2) may be encoded with instructions that, when executed, cause one or more processors (e.g., processor 122) to perform one or more of the acts illustrated in the method of FIGS. 1 and 2.

The method of FIG. 10 includes receiving, using a presence-sensitive user interface device (e.g., touch screen 102) coupled to the computing device, user input instructing processor 122 to activate Gesture Avatar mode (1002). In Gesture Avatar mode, user interface 102 may be converted to an input forum for the user to draw gestures that the user may use to operate target objects displayed on user interface 102 in an active application (e.g., application 104). In one example, to activate Gesture Avatar mode, the user may employ a hold-and-write mode switching technique, which includes pressing and holding a first finger (the holding finger), and starting to draw a gesture with a second finger (the gesturing finger). If the holding finger moves, Gesture Avatar mode may be deactivated and the user interface is operated in a normal manner in response to the user's touch. In another example, the Gesture Avatar mode may be selected from a menu item or a press of a dedicated button (soft or hard) on computing device 105.

Once in Gesture Avatar mode, the method further includes receiving, using a touch-sensitive device coupled to a computing device, user input corresponding to a drawn gesture, the drawn gesture defining an attribute associated with one or more target elements that are displayed in a graphical user interface output at the computing device (1004). The one or more target elements may be associated with an active application running on the computing device. The method also includes defining, in the graphical user interface, a graphical selection area that is associated with the drawn gesture (1006). The graphical selection area may be, for example, a transparent area around the drawn gesture with which the user may interact anywhere within the selection area. The method further includes associating at least a first of the one or more target elements with the drawn gesture based at least in part on the attribute defined by the drawn gesture (1008), and selecting the associated at least first of the one or more target elements in the graphical user interface in response to receiving, using the touch-sensitive device, user input associated with the defined graphical selection area (1010).

Figure 11:
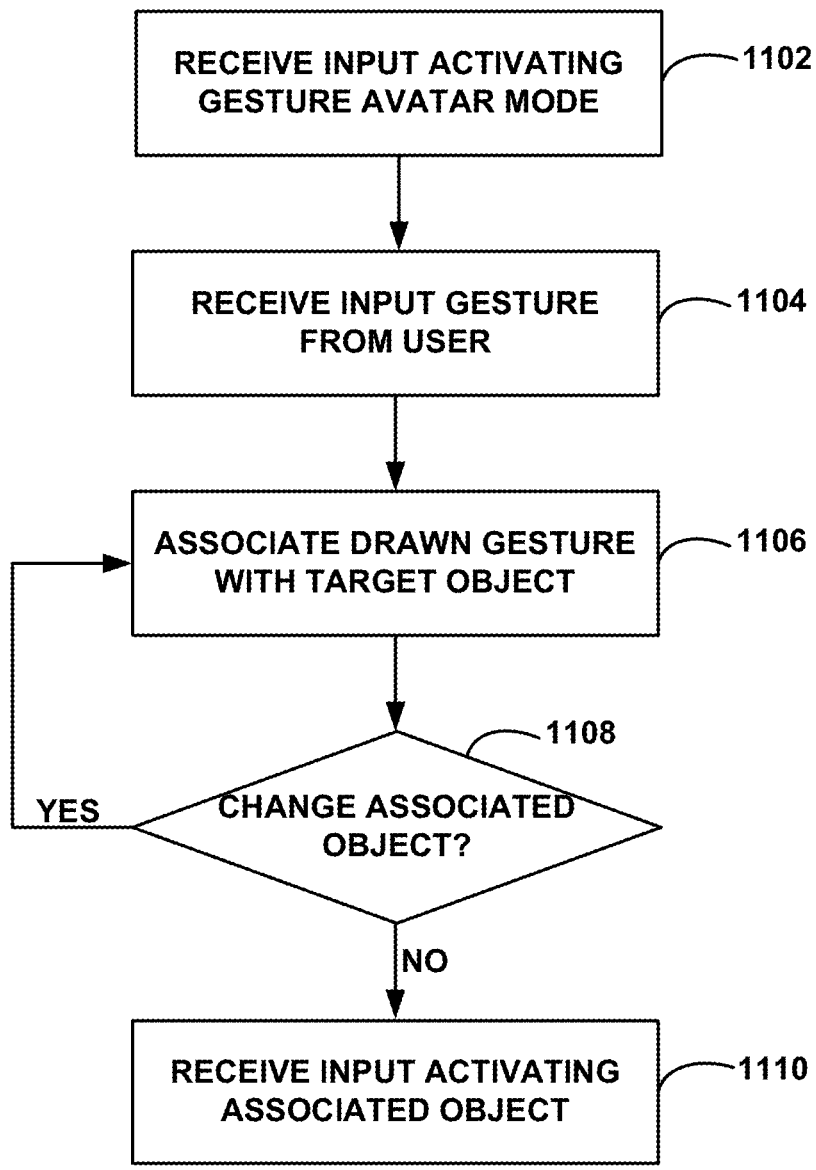
FIG. 11 is another flow diagram illustrating the method that may be performed by a computing device in accordance with one or more aspects of the present disclosure.

FIG. 11 is another flow diagram illustrating the method that may be performed by a computing device in accordance with one or more aspects of the present disclosure. For example, the illustrated example method may be performed, at least in part, by computing device 105 (FIGS. 1 and 2). In some examples, a computer-readable storage medium (e.g., a medium included in storage device 128 of FIG. 2) may be encoded with instructions that, when executed, cause one or more processors (e.g., processor 122) to perform one or more of the acts illustrated in the method of FIGS. 1 and 2.

The method of FIG. 11 includes receiving, using a presence-sensitive user interface device (e.g., touch screen 102) coupled to the computing device, user input instructing processor 122 to activate Gesture Avatar mode (1102). Once in Gesture Avatar mode, the user interface may receive user input, a drawing of a gesture indicating a character or shape associated with a desired target object (1104). Processor 122 may employ algorithms to recognize the shape or the character associated with the drawn gesture and associate the shape or character with an object displayed on the user interface (1106). Associating the drawn gesture with the target object may be achieved by displaying an indication of the association, e.g., highlighting the associated target object. Processor 122 may then determine whether the user wishes to change the associated target object (1108). In one example, the user may indicate a desire to find another object to associate with the drawn gesture by utilizing a directional gesture, as described above.

If the user indicates wish to change the associated object, processor 122 may associate the drawn gesture with another object that matches the shape or character recognized for the drawn gesture (1106). This may be repeated, until processor 122 no longer receives a signal or indication that the user wishes to change the associated object. If the user does not indicate a desire to change the associated object, the method also includes receiving, using the presence-sensitive user interface, user input that activates the associated object by manipulating the drawn gesture (1110). The user input to activate the associated object may depend on the type of object. If the object is a link or an element that is operable with a click, for example, the user may tap on the drawn gesture to activate the object. In another example, the object may be operated in a different manner such as, for example, by pressing on the drawn gesture and moving it around, such as in the example of a widget on a multimedia application. In one example, once the object is operated or activated, processor 122 may exit the Gesture Avatar mode and return to normal operation. In another example, processor 122 may remain in Gesture avatar mode until the user indicates explicitly return to normal mode.

In one example of this disclosure, the operating application that controls the Gesture Avatar mode may be adaptable and may train the operating application as the user uses it. In one example, operating application may have access to all the information about the application running underneath user interface 102. One such example may be web pages where all information about the web pages' user interfaces may be accessed from the web pages' DOM. Therefore, to make Gesture Avatar a general technique, applicable in different user interfaces and/or different computing devices, the knowledge that Gesture Avatar needs from the underneath user interface may be abstracted and formulated by defining a simple set of application programming interfaces.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

Various embodiments of the disclosure have been described. These and other embodiments are within the scope of the following claims.

What is claimed is:

1. A method comprising:
   outputting, by a computing device and for display, a graphical user interface;
   receiving, by the computing device, an indication of a first gesture, the first gesture being a drawn gesture that is received at a presence-sensitive user interface device, wherein the first gesture indicates an attribute that is associated with one or more elements included in the graphical user interface, and wherein the first gesture defines a graphical selection area in the graphical user interface;
   outputting, by the computing device and in the graphical user interface, an indication of the graphical selection area defined by the first gesture;
   associating, by the computing device and based at least in part on the attribute indicated by the first gesture, at least a first of the one or more elements with the graphical selection area, wherein the graphical selection area does not enclose at least the first of the one or more elements in the graphical user interface; and
   responsive to receiving an indication of second gesture received at a portion of the presence-sensitive user interface device that is associated with the graphical selection area, selecting, by the computing device, at least the first of the one or more elements in the graphical user interface.

2. The method of claim 1, further comprising:
   graphically emphasizing at least the first of the one or more elements in the graphical user interface.

3. The method of claim 1, wherein the attribute comprises a shape of at least the first of the one or more elements.

4. The method of claim 1, further comprising:
   receiving an indication of a directional gesture received at a portion of the presence-sensitive user interface device that is associated with an area outside of the graphical selection area in the graphical user interface; and
   modifying the graphical selection area based on a direction of the directional gesture.

5. The method of claim 4, further comprising:
   responsive to modifying the graphical selection area, graphically emphasizing at least a second of the one or more elements in the graphical user interface, wherein the graphical selection area is positioned closer to at least the second of the one or more elements in the graphical user interface than to at least the first of the one or more elements; and
   responsive to receiving an indication of a third gesture to interact with the graphical selection area, selecting at least the second of the one or more elements.

6. The method of claim 1, further comprising:
   outputting, by the computing device and for display, a graphical representation of the first gesture in the graphical user interface.

7. The method of claim 6, wherein outputting the indication of the graphical selection area comprises outputting the indication of the graphical selection area based on a distance between at least the first of the one or more elements and the graphical representation of the first gesture in the graphical user interface.

8. The method of claim 1, further comprising:
graphically emphasizing the graphical selection area in the graphical user interface.

9. The method of claim 1, wherein the second gesture with the graphical selection area comprises at least one of a tap input and a drag input.

10. The method of claim 1, wherein the presence-sensitive user interface device comprises a touchscreen that displays the graphical user interface.

11. The method of claim 1, wherein selecting at least the first of the one or more elements comprises selecting at least the first of the one or more elements to perform a function.

12. The method of claim 1, wherein selecting at least the first of the one or more elements comprises moving at least the first of the one or more elements.

13. A non-transitory computer-readable storage medium encoded with instructions that, when executed, cause one or more processors to perform operations comprising:
outputting, for display, a graphical user interface;
outputting, for display and based at least in part on an indication of a first gesture, the first gesture being a drawn gesture that is received at a presence-sensitive user interface device, an indication of a graphical selection area in the graphical user interface, wherein the first gesture indicates an attribute that is associated with at least one element included in the graphical user interface, wherein the first gesture defines the graphical selection area in the graphical user interface, and wherein the graphical selection area does not enclose the at least one element in the graphical user interface;
outputting, for display, the at least one element such that it is graphically emphasized within the graphical user interface; and
responsive to receiving an indication of a second gesture received at a portion of the presence-sensitive user interface device that is associated with the graphical selection area, selecting the at least one element in the graphical user interface.

14. The non-transitory computer-readable storage medium of claim 13, wherein selecting the at least one element comprises selecting the at least one element to perform a function.

15. The non-transitory computer-readable storage medium of claim 13, wherein selecting the at least one element comprises moving the at least one element according to the second gesture.

16. A computing device, comprising:
one or more processors;
a presence-sensitive user interface device operatively coupled to the one or more processors of the computing device, wherein the presence-sensitive user interface device is configured to receive a first gesture, the first gesture being a drawn gesture, the first gesture indicating an attribute that is associated with one or more elements included in a graphical user interface output for display at the presence-sensitive user interface device, and the first gesture further defining a graphical selection area in the graphical user interface; and
at least one module operable by the one or more processors to:
output, in the graphical user interface, a graphical selection area that is defined by the first gesture; and
associate at least a first of the one or more elements with the first gesture, wherein the graphical selection area is larger in size than at least the first of the one or more elements, wherein the graphical selection area does not enclose at least the first of the one or more elements in the graphical user interface, and wherein in response to the presence-sensitive user interface device receiving a gesture at a portion of the presence-sensitive user interface device that is associated with the graphical selection area, the second user input comprising a gesture, the graphical selection area is used to select at least the first of the one or more elements in the graphical user interface.

17. The computing device of claim 16, wherein the graphical selection area is used to select at least the first of the one or more elements in the graphical user interface according to the second gesture to perform a function.

18. The computing device of claim 16, wherein the graphical selection area is used to select at least the first of the one or more elements in the graphical user interface according to the second gesture to move the at least one element according to the second gesture.

19. The computing device of claim 16, wherein the attribute comprises a shape of at least the first of the one or more elements.

* * * * *